Patented Mar. 6, 1923.

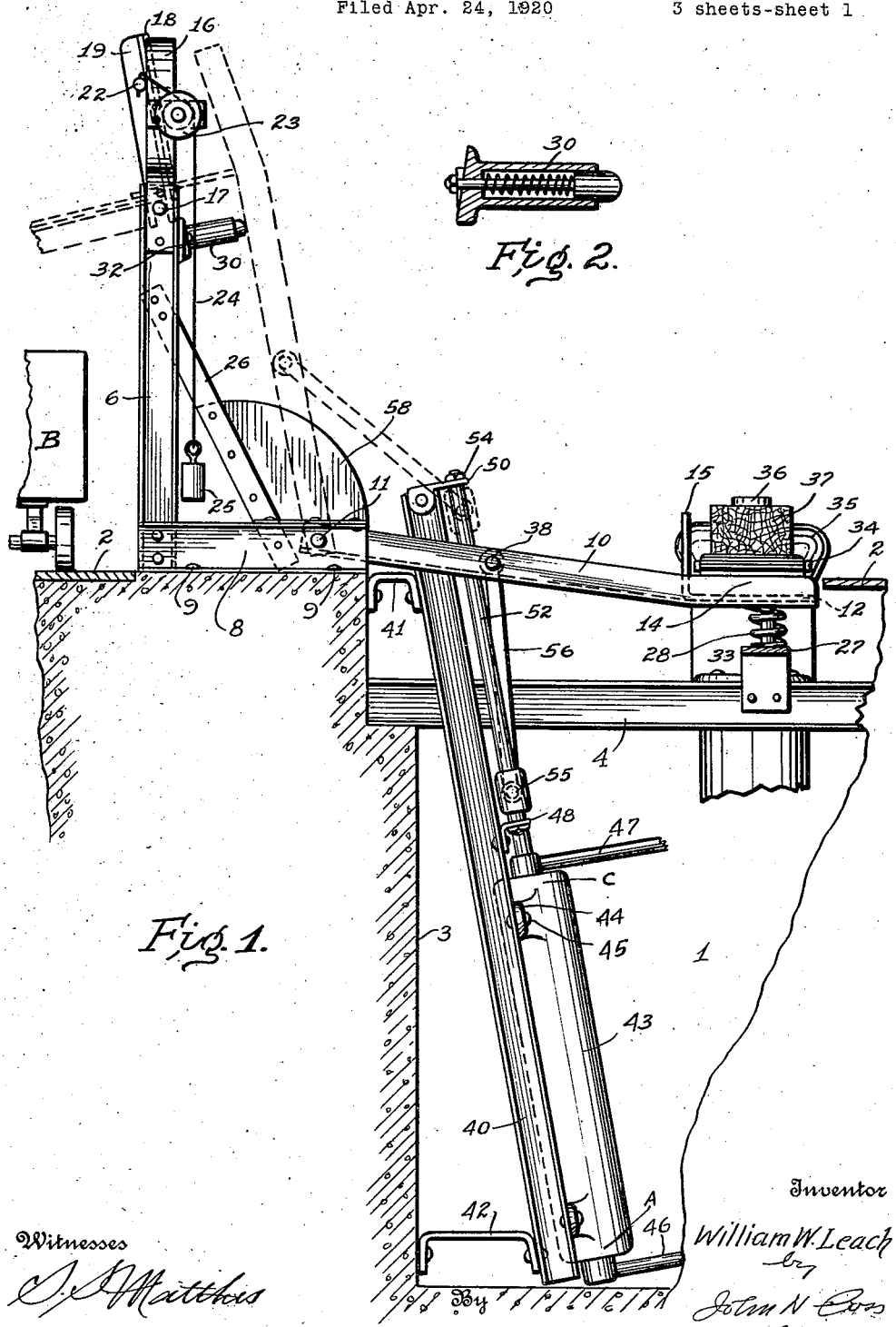

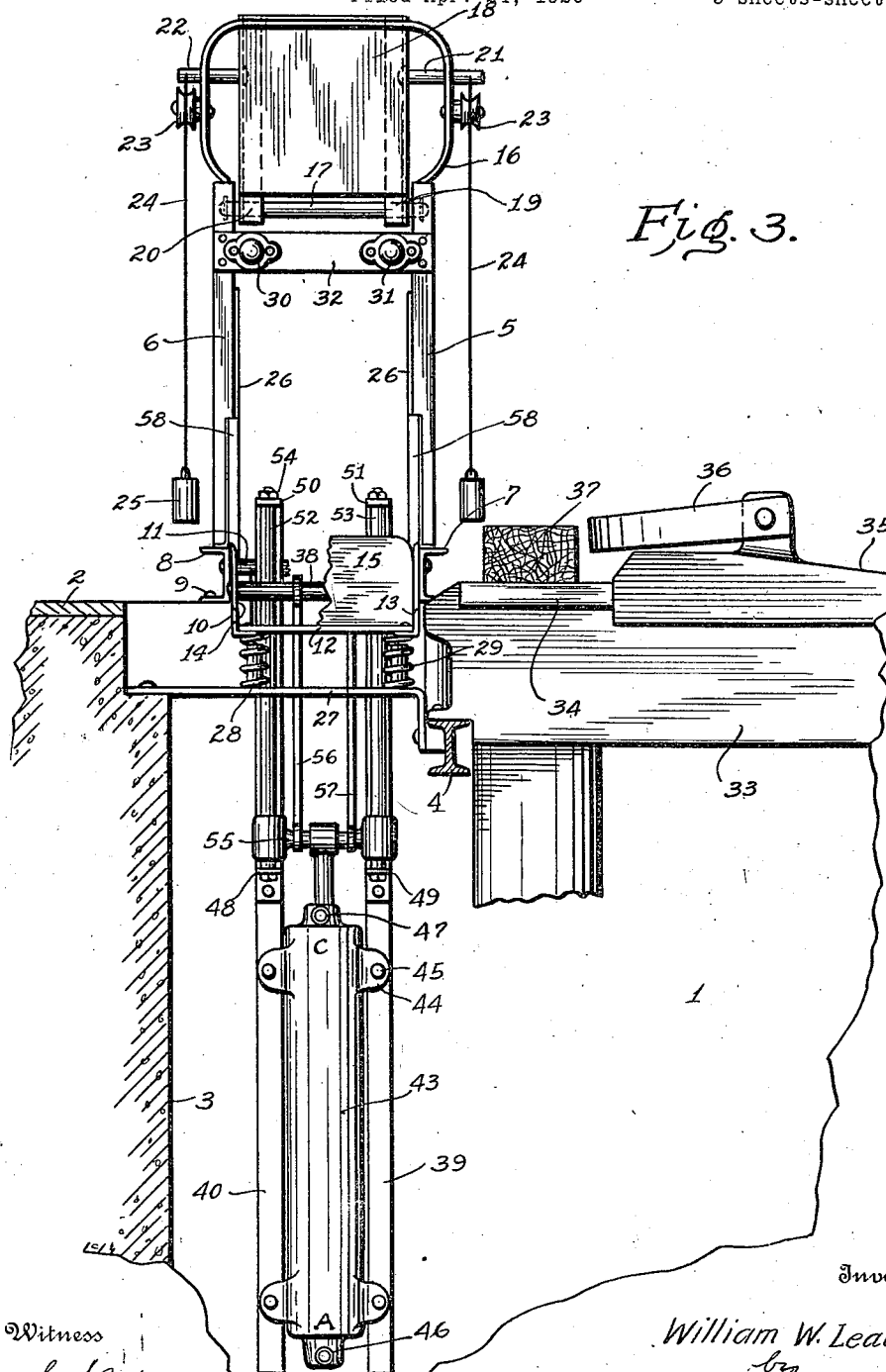

1,447,255

UNITED STATES PATENT OFFICE.

WILLIAM W. LEACH, OF MANSFIELD, OHIO.

LOADER.

Application filed April 24, 1920. Serial No. 376,402.

*To all whom it may concern:*

Be it known that I, WILLIAM W. LEACH, a citizen of the United States of America, residing at Mansfield, in the county of Richland and State of Ohio, have invented certain new and useful Improvements in a Loader, of which the following is a specification.

This invention relates to a loader.

The primary object of the present invention is to provide means of lifting, conveying and depositing a load into a car or the like which is automatically operable through the medium or agency of compressed air, hydraulic pressure, steam or the like.

A further object of the present invention is to provide a loader that is especially adapted to be used as an auxiliary loading mechanism in association with a baler of a conventional type which is adapted to be used to bale steel scrap or the like, the loader being so arranged and associated with the baler as to receive the bale from the baler automatically without hand manipulation of the bale upon part of the operator of the baler or loader.

The preferred structure for carrying out my invention consists in pivotally mounting a beam or frame so as to permit its free end to be associated with a scrap baler of a conventional type and to provide power means (preferably compressed air) for pivoting or reciprocating the beam or frame vertically for the purpose of loading the scrap bale into a car or the like and returning the beam to its normal position.

These and other objects are attained by the mechanism illustrated in the accompanying drawing in which:

Fig. 1 is a side elevation of the loader showing it associated with a baler.

Fig. 2 is a sectional view of one of the spring cushion bumpers.

Fig. 3 is a front elevation of the loader as shown in Fig. 1.

Figure 4:
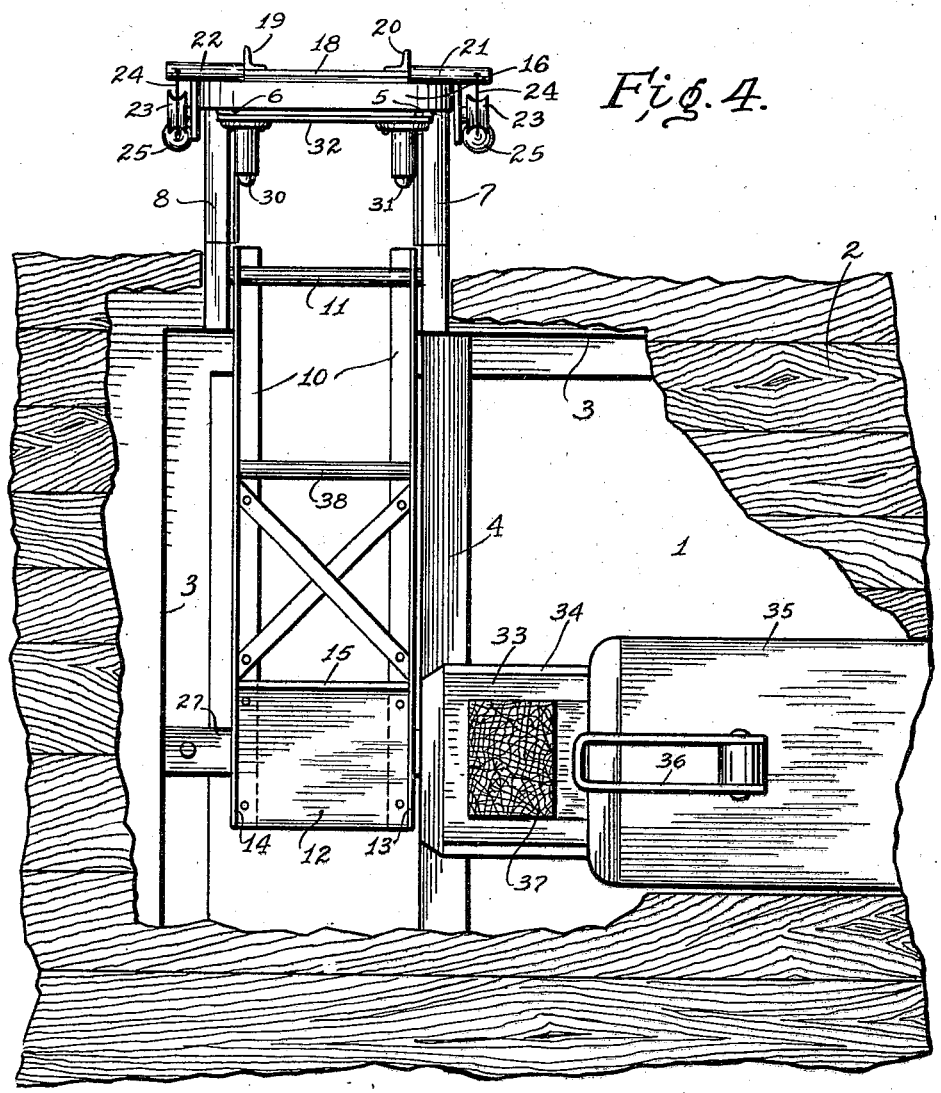
Fig. 4 is a top plan view of the loader as shown in Fig. 1.

The structure shown in the drawings is especially adapted and designed and constructed to be used in association with a conventional scrap baler of any type. It is well known to those who are skilled in the art that scrap balers are provided with a reciprocating top or cover which is operated to shove or force the scrap bale from the baler and under ordinary circumstances permitting the scrap bale to be deposited or discharged upon the floor or the like and then when desired to load same into a car manually carried and lifted into the car for loading purposes.

The loader shown and described is so arranged as to receive and retain the scrap bale after it is forced from the baler without hand manipulation. The loading mechanism is operated through the medium of compressed air or the like to lift, convey, deliver and load the scrap bale into a car or the like. The loader is so located in its association with the baler that when it is actuated to perform the function of loading and as it reaches the end of its upward vertical movement, the scrap bale will be discharged or ejected from the loader into the car.

In construction, assembling and installing the loader a pit 1 is preferably provided below a floor 2 and enclosed preferably by cement walls or other structures 3 and 4.

A frame work consisting of upright or vertical standards 5 and 6 and attached horizontal members 7 and 8 is provided. The horizontal members are securely attached to the foundation or structure 3 by rivets 9 or the like. A hoisting and conveying beam or frame 10 is pivotally mounted upon a shaft 11 which is secured to the horizontal frame members 7 and 8 as shown in Fig. 4. The beam is adapted to be pivoted vertically. At the free end of the hoisting and conveying beam an L-shaped member 12 is securely attached providing a receptacle in connection with the side members 13 and 14 of the beam. One part of the L shaped member 12 provides the bottom and the other part 15 extends up a considerable distance beyond the plane of the top of the angle irons constituting the side members of the hoisting and lifting beam for a purpose which will be described hereinafter.

An open frame 16 is attached to the vertical standards 5 and 6 as shown in Fig. 3. A rod 17 is secured adjacent to the upper portion of the standards 5 and 6 as shown in Fig. 3 and a table 18 is pivotally mounted thereon. Angle irons 19 and 20 are secured to each side of the chute 18 and pins 21 and 22 are also secured thereto, the free ends thereof extending beyond the sides of the frame 16 for the purpose of contacting therewith under normal conditions. On both sides of the frame 16 sheave pulleys 23 are mounted and cables 24 connected to the pins 21 and 22 passing over the peripheries of the sheave pulleys. Weights 25 are attached to the free end thereof thereby normally holding the pivoted door 18 in contact with the frame as shown in Fig. 3.

The standards 5 and 6 of the frame work are braced to the horizontal parts of the frame work 8 and 7 by corner braces 26. A supporting bar 27 having two coil springs 28 and 29 mounted thereon is provided and attached to the foundation and frame work as shown in Fig. 3. The coil springs provide a yielding support for the hoisting and conveying beam when it is in its normal position as shown in Fig. 1 and also provides a cushion or yielding abutment and support to contact with the hoisting and conveying beam when it is returned to its normal position after depositing or delivering the scrap bale into a car or the like. Yielding bumper means 30 and 31 are provided and attached to a plate 32 which is secured to the upright standards 5 and 6 and they are adapted to contact with the hoisting and conveying beam when it reaches the end of its upward vertical movement and about to discharge and deposit the scrap bale into a car or the like.

The conventional baler used in association with the loader is illustrated by the reference numerals 33 and the guides thereof by reference numeral 34. The reciprocating member of the conventional type of a baler is represented by the reference numerals 35 and it carries a pivoted bumper 36 which extends beyond the forward end of the reciprocating member 35 of the baler as shown in Fig. 3. A bale of scrap 37 is shown mounted upon the baler 34 in a position to be forced, shoved or delivered into the receptacle of the hoisting and conveying beam. In order to impart a vertical movement to the hoisting and conveying beam the following means are provided. A journal shaft 38 is secured to the hoisting and lifting beam as shown in Fig. 4. A frame work preferably consisting of I beams 39 and 40 are arranged and located in the pit 1 preferably at an incline to the horizontal as shown (see Fig. 1).

The I beams are attached to the foundation structure by brackets 41 and 42. The cylinder of an air operated motor 43 is attached to the I beams through the medium of the ears 44 and the bolts 45. The air operated motor is of a conventional type and is operated in a conventional manner by a three way valve which admits air into either end of the motor as desired or prevents it from entering into either when in neutral position. The air supply pipes 46 and 47 conduct air to the cylinder from any source of supply. Supporting brackets 48, 49, 50 and 51 are attached to the I beams 39 and 40 and they are provided with bearings into which the guide rods 52 and 53 are inserted and secured thereto by the nuts 54. A cross-head 55 is mounted for reciprocation on the guide rods 52 and 53 as shown more clearly in Fig. 3. The cross-head is provided with journals to engage one end of connecting rods 56 and 57. The opposite ends of the connecting rods are connected and journaled upon the shaft 38 thereby connecting the hoisting and conveying beam to the reciprocating mechanism of the air operated motor.

Shields 58 are provided to prevent the operator from placing his hands between the oscillating, hoisting and conveying beam and the standards. The angle irons 19 and 20 of the pivoted chute 18 are slotted to provide a pivotal bearing on the rod 17 and which will also permit the door to become detached from said rod in case it should be inadvertently subjected to undue pressure or struck by a moving car or the like.

In the operation of a loader in association with a conventional type of scrap baler as shown in the drawings after the scrap is compressed and baled it is elevated by the baler to a position flush with or slightly above the top of the guides 34 as indicated by the scrap bale 37 as shown in Fig. 3 of the drawings. A motor operable by compressed air or the like is ordinarily used to reciprocate the member 35 of the baler upon the guides 34. When movement is imparted to the reciprocating member 35 of the baler the pivoted bumper 36 contacts with the scrap bale 37 and forces it to move and drop onto the member 12 of the receptacle.

Compressed air or the like for operating a piston in the cylinder 43 is admitted in the end A of the cylinder and the pressure forces the piston to the end of its upward stroke and through the connecting mechanism heretofore described swinging the beam upon which the scrap bale is carried to the dotted line position as shown in Fig. 1. The hoisting and conveying beam when in the dotted line position rests upon the yielding spring bumpers 30 and 31, the inclined positioned flange 15 of the member 12 when the beam is in the dotted line position overlapping the inclined positioned chute 18 thereby forming an inclined slide-way for the scrap bale to slide by gravity into a car B or the like as shown in Fig. 1.

When it is desired to operate the loader for loading purposes the pivoted chute 18 is preferably positioned on an incline as shown in dotted lines in Fig. 1 the gravity thereof maintaining it in said position.

When it is desired to return the hoisting and conveying beam to its normal position, that is, resting and being supported upon the coil springs 28 and 29, compressed air or the like is admitted to the upper end of the cylinder C and the piston forced to complete a downward stroke thereby forcing the connecting mechanism and the hoisting and conveying beam to return to their normal positions as shown in Fig. 1. The operation as described above of the loader in association with the baler is repeated periodically in loading a car or the like.

The operation of the baler briefly is as follows: Loose scrap sheet steel or the like is deposited in the baler hopper. The baler 33 is then reciprocated to cover the scrap and the scrap in the baler hopper is then subjected to pressure from a horizontal direction in the first instance and then subjected to pressure in a vertical direction thereby compactly forcing the scrap material into compact form as shown in the bale indicated by numerals 37. The bale is then elevated to its proper position flush or slightly above the guides 34 and forced to move so as to be delivered into the receptacle of the beam of the hoisting and conveying mechanism.

It is not intended to limit this invention to its association with a baler of the type shown as it is obvious that without changing the construction materially or departing from the spirit of the invention that it can be used with or without association with any type of baler or other devices of different types. It has been found, however, to be especially adapted for efficient and economical use in association with balers such as the type shown in mills for the purpose of bailing scrap and the like.

I claim:

1. In a loader, a frame work comprising beams, an auxiliary open frame attached to the vertical standards, a tilting chute secured to the frame work and adapted to contact when in normal position with the auxiliary frame work, means attached to the tilting chute to normally hold same in contact with said auxiliary frame, a hoisting and conveying beam pivotally attached to said frame work and power operated means to impart a vertical oscillating movement to the hoisting and conveying beam.

2. In a loader, a frame work comprising beams, an auxiliary open frame attached to the vertical standards, a tilting chute secured to the frame work and adapted to contact when in normal position with the auxiliary frame work, means attached to the tilting chute to normally hold same in contact with said auxiliary frame, a hoisting and conveying beam pivotally attached to said frame work, power operated means to impart a vertical oscillating movement to the hoisting and conveying beam, yielding means to support the free end of the beam when in normal position and yielding bumper means to contact with the beam at the end of its upward stroke.

3. In a loader, a frame work comprising beams, a tilting chute pivotally secured to the vertical standards, an auxiliary frame attached to the vertical standard, means to hold the chute in contact with the auxiliary frame said door being arranged to be maintained by its gravity in an inclined position and in contact with a frame by weights.

4. In a loader, a frame work, a beam pivoted for vertical movement to said frame work, a receptacle provided at its free end, cushion abutment means adapted to contact with the beam and support it at the end of its vertical movement in either direction and power operated means located beneath the hoisting beam and connected thereto and adapted when operated to impart a vertical movement to the beam as and for the purpose described.

5. In a loader, a frame work comrising beams, an auxiliary open frame attached to the beams, a tilting chute secured to the frame work and adapted to contact when in normal position with the auxiliary frame, means attached to the tilting chute to normally hold same in contact with said auxiliary frame, a hoisting and conveying beam pivotally attached to said frame work and power operated means to impart a vertical oscillating movement to the hoisting and conveying beam.

6. In a loader, a frame work comprising beams, an auxiliary open frame attached to the beams, a tilting chute secured to the frame work and adapted to contact when in normal position with the auxiliary frame, means attached to the tilting chute to normally hold the same in contact with said auxiliary frame, a hoisting and conveying beam pivotally attached to said frame work, power operated means to impart a vertical oscillating movement to the hoisting and conveying beam, yielding means to support the free end of the beam when in normal position and yielding bumper means to contact with the beam at the end of its upward stroke.

7. In a loader, a frame work, a beam pivoted for vertical movement to said frame work, a receptacle provided at its free end, cushion abutment means adapted to contact with the beam and support it at the end of its vertical movement in either direction and power operated means located beneath the hoisting beam and connected thereto and adapted when operated to impart a vertical movement to the beam as and for the purpose described.

8. In a loading mechanism, a frame, a hoisting and conveying beam pivoted thereto for vertical movement, inclined parallel supporting members arranged below the frame, and a motor supported on said supporting members and connected to the hoisting and conveying beam to impart a vertical oscillating to the hoisting and conveying beam.

9. In a loading mechanism, a frame, a hoisting and conveying beam pivoted thereto for vertical movement, inclined parallel supporting members arranged below the frame, a motor supported on said supporting members and connected to the hoisting and conveying beam to impart movement thereto, and means associated with said hoisting and conveying mechanism operable to deposit a load of material on the hoisting and conveying beam.

10. In a machine for loading bales of scrap metal, a frame provided with vertical and horizontal members, a swinging chute attached to the vertical members of the frame, a hoisting and conveying beam pivotally attached to the horizontal members of the frame, inclined supporting members arranged in front of and depending below the frame, a motor supported on the supporting members and means to connect the motor to the hoisting and conveying beams as described and for the purpose set forth.

11. In a loader, a frame, vertically movable means pivotally connected to the frame, a swinging chute secured to the frame operable to swing in one direction by impact and in the opposite direction by the force of gravity, power means to operate the vertically movable means and yielding abutments secured to the frame to resist and cushion the impact of the vertically movable means at the end of its up and down movement.

12. In a loader, a frame, a vertically movable means pivotally connected to a beam, a swinging chute secured to the frame operable to swing in one direction by impact and in the opposite direction by the force of gravity, power means to operate the vertically movable means, yielding abutments secured to the frame to support and cushion the vertically movable means at the end of its upward movement, and means to yieldingly support the vertically movable means at the end of its downward movement.

13. In a loader, a frame, hoisting and conveying means pivotally secured to the frame for vertical movement, a motor located below the frame, means connected to the hoisting means and motor, means to cushion the hoisting mechanism at the end of the upward and downward stroke, and means associated with the loader to deposit a load upon the hoisting and conveying means, as described and set forth.

14. In a loading apparatus, a frame, a swinging chute secured thereto, a beam pivotally attached to said frame for vertical oscillating movement, inclined auxiliary supporting frame members arranged in front of and located below the first mentioned frame, a motor supported on the auxiliary frame members, means for connecting the motor to the pivoted beam, the motor being operable to impart a vertical oscillating movement to the beam, as described and set forth.

15. In a loading apparatus, a frame, a swinging chute secured thereto, a beam pivotally attached to said frame for vertical oscillating movement, inclined auxiliary supporting frame members arranged in front of and located below the first mentioned frame, a motor supported on the auxiliary frame members, means connecting the motor and pivoted beam, the motor being operable by compressed air to impart movement to the pivoted beam, and means associated with the loader to load a bale upon the beam, as described and set forth.

16. In a loader for loading metal scrap bales, a stationary frame, a swinging member pivoted thereto and adapted to form part of a chute, a swinging frame attached to said frame and adapted to swing in a vertical direction from and to its normal horizontal position, means to cushion the throw of the swinging frame at both ends of its movement, a power operated mechanism connected to said swinging frame and adapted to actuate the swinging frame beyond the axial line of its vertical movement as and for the purpose described.

17. In a loader, a stationary frame, a swinging frame attached to said frame and adapted to swing in a vertical direction from and to its normal horizontal position, a power operated mechanism connected to said swinging frame and adapted to actuate the swinging frame beyond the axial line of its vertical movement, a chute pivotally secured to the stationary frame and adapted to be held in upright or normal position by weights, a receptacle secured to the free end of the swinging frame and adapted to provide part of an inclined run way adapted to permit the load in the receptacle by force of gravity to contact with and move the pivoted chute to an inclined position at the point of delivery as and for the purpose described.

18. In a loader, a frame, a swinging frame attached to said frame and adapted to swing in a vertical direction from and to its normal horizontal position, a power operated mechanism connected to said swinging frame and adapted to actuate the swinging frame beyond the axial line of its vertical movement, a chute pivotally secured to the stationary frame and adapted to be held in upright or normal position by weights, a receptacle secured to the free end of the swinging frame and adapted to provide part of an inclined run way, when the load in the receptacle moves by force of gravity the pivoted chute to an incline position, yielding means provided on the stationary frame to receive the impact of the swinging frame and engage it at the end of its vertical movement and a yielding support to support the swinging frame in a horizontal position.

19. In a loader, an open frame formed of beams, vertical and horizontal members, a chute pivoted to the free end of the vertical members and means to yieldingly hold said chute in its upright position, a swinging frame attached to the horizontal beams of the frame and having means on its free end to receive a load and an air operated motor attached to the swinging frame to impart a vertical movement to the swinging frame from and to its normal position.

20. In a loader, an open frame formed of beams and provided with vertical and horizontal members, a chute pivoted to the free end of the vertical members, means to yieldingly hold said chute in its upright position, a swinging frame attached to the horizontal beams of the frame and having means on its free end to receive a load, an air operated motor attached to the swinging frame to impart a vertical movement to the swinging frame from and to its normal horizontal position, said load receiving means also being adapted to provide part of an incline run way in combination with the pivoted chute when the load contacts with and actuates the pivoted chute to provide part of an incline run way for delivering the load.

21. In a loader comprising an open L shape frame which is mounted on a suitable foundation, a yielding supporting means, a swinging frame attached to the open frame having a receptacle provided thereon for carrying a load and adapted when in normal position to be supported upon said yielding supporting means, and power operated means connected to the swinging frame and adapted to impart movement thereto.

22. In a loader comprising an open L shape frame which is mounted on a suitable foundation, a yielding supporting means, a swinging frame attached to the open frame having a receptacle thereon for carrying a load and adapted to be supported when in normal position upon the yielding supporting means, power operated means connected to the swinging frame work and adapted to impart movement to the swinging frame, a chute pivoted to the frame work and adapted to be operated by the load to swing to an inclined position, thereby forming part of an inclined runway in association with the receptacle for the purpose of delivering the load.

23. In a loader, the combination of an open frame having a swinging frame pivoted thereto and adapted to be supported in a horizontal plane, a carrier secured to the free end of the swinging frame, an air operated motor connected to said swinging frame, and adapted to impart movement thereto to swing the frame in a vertical direction and beyond the axial line of its vertical movement, a chute pivoted to the frame and adapted to be yieldingly held in an upright position whereby when the load is ejected from the carrier, it will be forced by gravity in contact with the chute and carrier to move to an inclined position forming an inclined run way with part of the carrier over-lapping the chute and forming the other part of the run way.

24. The combination of all the elements described in claim 23 combined and associated with means arranged at the side of the swinging arm for delivering a load upon the carrier sidewise, as and for the purpose described.

25. In a loader, a frame comprising spaced apart vertical and horizontal members, a chute pivoted to the vertical members and adapted to be yieldingly held in its upright position, yielding bumpers secured to the vertical members, a pit, a yielding frame work secured in said pit, a swinging frame attached to the horizontal members of the frame and adapted to be supported in a horizontal position upon yielding supports and power operated means connected to the swinging frame and adapted to impart vertical to and fro movement to the swinging frame at the will of the operator.

26. In a loader, a frame comprising spaced apart vertical and horizontal members, a chute pivoted to the vertical members and adapted to be yieldingly held in its upright position, yielding bumpers secured to the vertical members, a pit, a yielding support secured in said pit, a swinging frame attached to the horizontal members and adapted to be supported in a horizontal position upon the yielding support, power operated means connected to the swinging frame and adapted to impart vertical to and fro movement to the swinging frame at the will of the operator, a receptacle secured to the free end of the frame, said receptacle being adapted to form part of an inclined run way and to permit the load thereon to slide and contact with the pivoted chute and force it to an inclined position in overlapping relation therewith to provide a run way for delivery of the load by a force of gravity.

27. In a loader comprising a stationary frame having horizontal and vertical members, a swinging frame having a receptacle provided thereon secured to the horizontal members, means of imparting a to and fro vertical movement to the swinging frame, a chute pivoted to the vertical members of the frame and means provided by the co-operation of the receptacle and pivoted chute to form a run-way to deliver a load from the receptacle, as and for the purpose described.

28. In a scrap bale loader, a stationary frame, a swinging frame pivoted to the stationary frame and provided with a receptacle for carrying a load, power operated means connected to the swinging frame to impart movement thereto and a chute pivoted to the stationary frame, the receptacle also being adapted to provide a run way in association with the chute for the load.

29. In a metal scrap bale loader, comprising a stationary frame having a chute pivoted thereto, a swinging frame pivotally secured to the stationary frame, a receptacle secured to the free end of the swinging frame which is adapted to receive a load from a sidewise direction and carry same in a vertical direction and means to impart movement to the swinging frame and eject the load on the aforesaid chute for delivery.

30. In a loader comprising a stationary frame, a swinging frame pivotally secured thereto, a receptacle secured to the free end of the swinging frame which is adapted to receive and carry a load, means to impart movement to the swinging frame and eject the load and means actuated by the receptacle to receive, guide and deliver the load by force of gravity after it is ejected from the receptacle.

In testimony whereof I affix my signature.

WILLIAM W. LEACH.